US012123310B2

(12) United States Patent
Pixton et al.

(10) Patent No.: US 12,123,310 B2
(45) Date of Patent: *Oct. 22, 2024

(54) GAS TURBINE ENGINE WITH IDLE THRUST RATIO

(71) Applicant: RTX CORPORATION, Farmington, CT (US)

(72) Inventors: Stephen G. Pixton, South Windsor, CT (US); Gary Collopy, Vernon, CT (US); Ozhan Turgut, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,627

(22) Filed: Oct. 4, 2023

(65) Prior Publication Data
US 2024/0240569 A1 Jul. 18, 2024

Related U.S. Application Data

(63) Continuation of application No. 17/379,202, filed on Jul. 19, 2021, now Pat. No. 11,814,968.

(51) Int. Cl.
| F01D 15/12 | (2006.01) |
| F02C 3/00 | (2006.01) |
| F02C 7/32 | (2006.01) |

(52) U.S. Cl.
CPC ............... *F01D 15/12* (2013.01); *F02C 3/00* (2013.01); *F02C 7/32* (2013.01); *F05D 2220/323* (2013.01)

(58) Field of Classification Search
None
See application file for complete search history.

(56) References Cited

U.S. PATENT DOCUMENTS

| 11,814,968 B2 * | 11/2023 | Pixton | F02C 7/36 |
| 2013/0098058 A1 * | 4/2013 | Sheridan | F01D 25/18 |
| | | | 60/783 |
| 2021/0404387 A1 * | 12/2021 | Venter | F02C 7/32 |

* cited by examiner

*Primary Examiner* — David P. Olynick
(74) *Attorney, Agent, or Firm* — Carlson, Gaskey & Olds, P.C.

(57) ABSTRACT

A gas turbine engine according to an example of the present disclosure may include, among other things, a propulsor section including a propulsor having a plurality of propulsor blades, a geared architecture, a first spool including a first shaft that interconnects a first compressor and a first turbine, the first driving the propulsor through the geared architecture. The gas turbine engine is rated to provide an amount of thrust at ground idle, and the gas turbine engine is rated to provide an amount of thrust at maximum takeoff. A thrust ratio is defined as a ratio of the amount of thrust at ground idle divided by the amount of thrust at maximum takeoff. The thrust ratio can be less than or equal to 0.050.

21 Claims, 2 Drawing Sheets

GAS TURBINE ENGINE WITH IDLE THRUST RATIO

CROSS-REFERENCE TO RELATED APPLICATION

This application is a continuation application of U.S. application Ser. No. 17/379,202, filed on Jul. 19, 2021.

BACKGROUND

This application relates to gas turbine engines, and more particularly to thrust output of an engine at various operating conditions.

Gas turbine engines are known and may include a fan delivering air into a bypass duct as bypass air. The air is also delivered into a compressor. The compressed air is delivered into a combustor where it is mixed with fuel and ignited. Products of this combustion pass downstream to drive a turbine. The turbine may drive the fan and compressor.

The engine may incorporate two turbines and two compressors. A lower pressure turbine may drive a lower pressure compressor. Historically the low pressure compressor was fixed to a fan shaft to drive the fan. However, more recently a gear reduction has been placed between the low pressure compressor and the fan.

One or more aircraft and engine accessories may be driven by the engine during operation.

SUMMARY

A gas turbine engine according to an example of the present disclosure includes a fan section including a fan having a plurality of fan blades and including an outer housing surrounding the fan blades to establish a bypass duct, a geared architecture, and a first spool including a first shaft that interconnects a first compressor and a fan drive turbine. The fan drive turbine drives the fan through the geared architecture such that the fan is rotatable at a lower speed than a speed of the low spool. A second spool includes a second shaft that interconnects a second compressor and a second turbine. An overall pressure ratio is defined as a product of a fan pressure ratio across a root of the fan blade alone, a first pressure ratio across the first compressor, and a second pressure ratio across the second compressor. The overall pressure ratio is equal to or greater than 44.0 at cruise. The gas turbine engine is rated to provide an amount of thrust at ground idle. The gas turbine engine is rated to provide an amount of thrust at maximum takeoff. A thrust ratio is defined as a ratio of the amount of thrust at ground idle divided by the amount of thrust at maximum takeoff. The thrust ratio is less than or equal to 0.050.

In a further embodiment of any of the foregoing embodiments, a gear reduction ratio of the geared architecture is greater than or equal to 3.2 and is less than or equal to 4.0.

A further embodiment of any of the foregoing embodiments includes a first power takeoff from the first spool, and a second power takeoff from the second spool. A power extraction ratio is defined as a first quantity of power extracted by all aircraft accessories driven by the first power takeoff divided by a total quantity of power extracted by all aircraft accessories driven by the first power takeoff and all aircraft accessories driven the second power takeoff. The aircraft accessories perform sub-system functionality to operate an associated aircraft. The power extraction ratio is equal to or greater than 0.90 at ground idle.

In a further embodiment of any of the foregoing embodiments, the fan drive turbine drives the first compressor and an input of the geared architecture.

In a further embodiment of any of the foregoing embodiments, the gas turbine engine is rated to generate greater than or equal to 20,000 lb of thrust at maximum takeoff.

In a further embodiment of any of the foregoing embodiments, the gas turbine engine is rated to generate greater than or equal to 1,000 lb of thrust at ground idle.

In a further embodiment of any of the foregoing embodiments, the thrust ratio is greater than or equal to 0.020.

In a further embodiment of any of the foregoing embodiments, a combined pressure ratio is defined as a product of the fan pressure ratio across the root of the fan blade alone and the first pressure ratio, and the combined pressure ratio is greater than or equal to 3.5 and less than or equal to 6.0 at cruise.

In a further embodiment of any of the foregoing embodiments, a bypass ratio defined as a volume of air passing to the bypass duct divided by a volume of air passing into a compressor section comprising the first compressor, is greater than or equal to 10.0 at cruise.

In a further embodiment of any of the foregoing embodiments, the thrust ratio is less than or equal to 0.040.

In a further embodiment of any of the foregoing embodiments, the first compressor includes four stages, the second turbine includes two stages, and the fan drive turbine includes at least three stages but no more than six stages.

In a further embodiment of any of the foregoing embodiments, the thrust ratio is greater than or equal to 0.030.

In a further embodiment of any of the foregoing embodiments, the overall pressure ratio is greater than or equal to 50.0 at cruise.

A gas turbine engine according to an example of the present disclosure includes a fan section including a fan having a plurality of fan blades and including an outer housing surrounding the fan blades to establish a bypass duct, and a geared architecture defining a gear reduction ratio of greater than or equal to 3.0. A first spool includes a first shaft that interconnects a first compressor and a fan drive turbine. The first compressor includes a plurality of stages, and the fan drive turbine drives the fan through the geared architecture such that the fan is rotatable at a lower speed than a speed of the low spool. A second spool includes a second shaft that interconnects a second compressor and a second turbine, a first power takeoff from the first spool, and a second power takeoff from the second spool. The gas turbine engine is rated to provide an amount of thrust at ground idle. The gas turbine engine is rated to provide an amount of thrust at maximum takeoff. A thrust ratio is defined as a ratio of the amount of thrust at ground idle divided by the amount of thrust at maximum takeoff. The thrust ratio is less than or equal to 0.050. A power extraction ratio is defined as a first quantity of power extracted by all aircraft accessories driven by the first power takeoff divided by a total quantity of power extracted by all aircraft accessories driven by the first power takeoff and all aircraft accessories driven the second power takeoff. The aircraft accessories perform sub-system functionality to operate an associated aircraft. The power extraction ratio is equal to or greater than 0.90 at ground idle.

In a further embodiment of any of the foregoing embodiments, a bypass ratio defined as a volume of air passing to the bypass duct divided by a volume of air passing into a compressor section comprising the first compressor, is greater than or equal to 10.0 at cruise.

In a further embodiment of any of the foregoing embodiments, a combined pressure ratio is defined as a product of a fan pressure ratio across a root of the fan blade alone and a first pressure ratio across the first compressor, and the combined pressure ratio is greater than or equal to 3.5 and less than or equal to 6.0 at cruise.

In a further embodiment of any of the foregoing embodiments, the fan pressure ratio across the root of the fan blade alone is less than or equal to 1.45 at cruise. The thrust ratio is greater than or equal to 0.020.

In a further embodiment of any of the foregoing embodiments, a gear reduction ratio of the geared architecture is greater than or equal to 3.2, and the gas turbine engine is rated to generate greater than or equal to 20,000 lb of thrust at maximum takeoff.

In a further embodiment of any of the foregoing embodiments, the power extraction ratio is greater than or equal to 0.95 at ground idle.

In a further embodiment of any of the foregoing embodiments, an overall pressure ratio is defined as a product of a fan pressure ratio across a root of the fan blade alone, and a first pressure ratio across the first compressor and a second pressure ratio across the second compressor. The overall pressure ratio is equal to or greater than 44.0 at cruise. The thrust ratio is greater than or equal to 0.025. The gas turbine engine is rated to generate greater than or equal to 20,000 lb of thrust at maximum takeoff. A gear reduction ratio of the geared architecture is greater than or equal to 3.2 and is less than or equal to 4.0.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
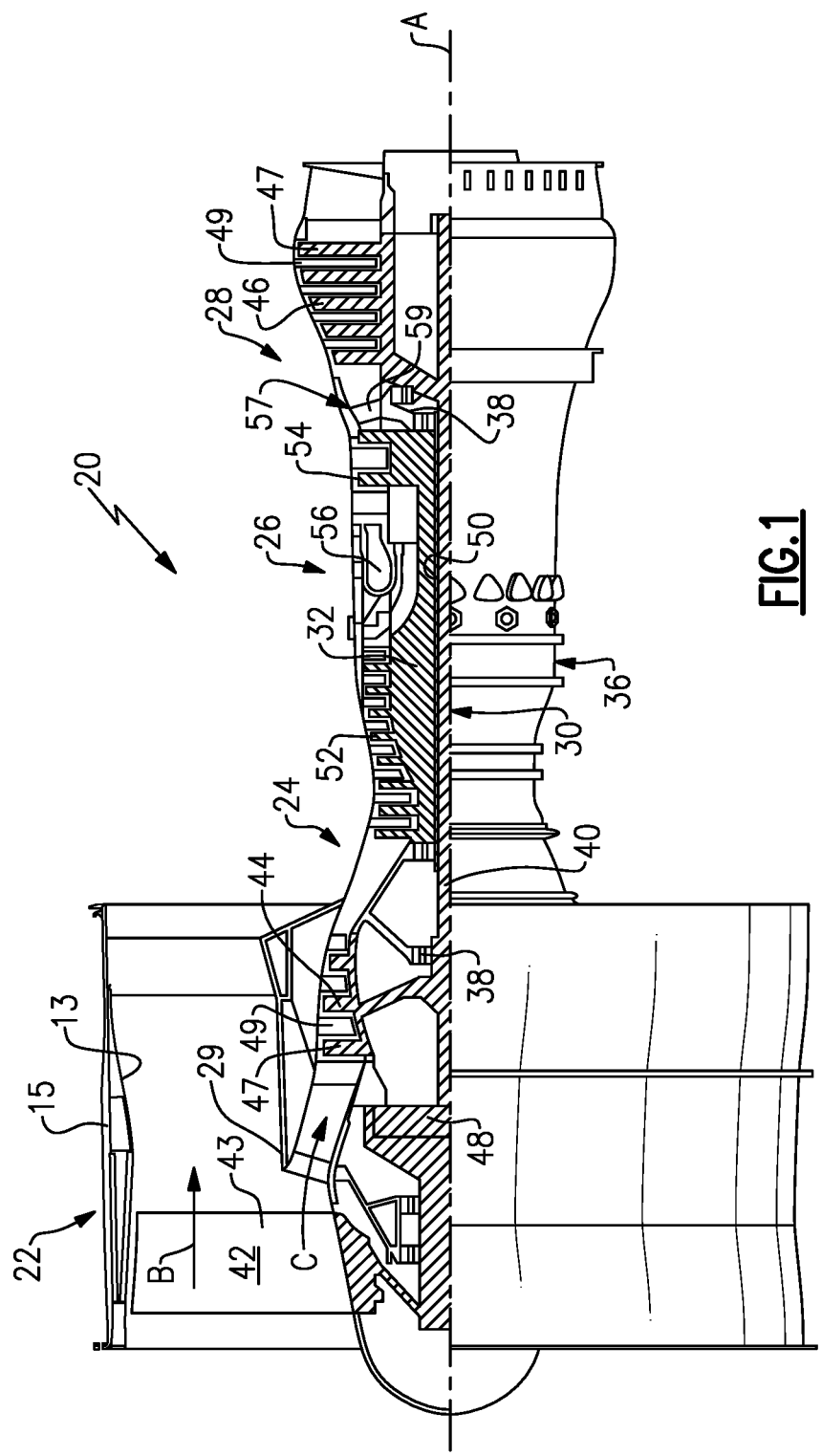
FIG. 1 illustrates a sectional view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 38 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(\text{Tram}\,°\text{R})/(518.7°\text{R})]0.5$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a product of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 7.0 and 12.0, or more narrowly is between 10.0 and 11.5. The OPR can be equal to or greater than 44.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0 OF and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Applicant previously designed, manufactured and flew a first generation gas turbine engine with a gear reduction between the low pressure compressor and the fan. A gear reduction ratio of the gear reduction in those engines was 3.06, or lower. This disclosure relates to gas turbine engines with a geared architecture incorporating a gear reduction utilized in combination with relatively lower ratios of ground idle thrust to MTO thrust. The disclosed engines may incorporate gear reduction ratios greater than Applicant's first generation geared gas turbine engines.

Figure 2:
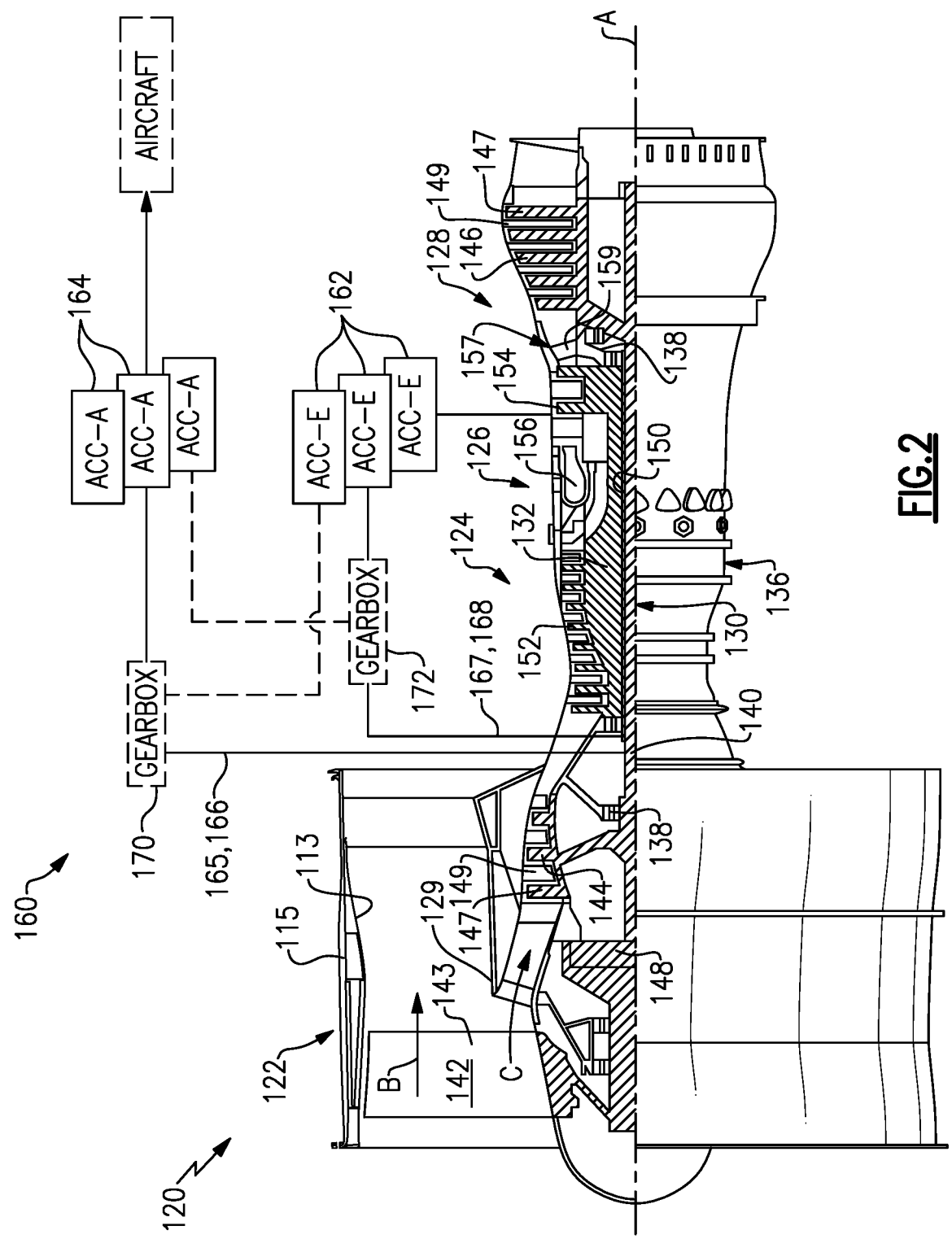
FIG. 2 illustrates a sectional view of another exemplary gas turbine engine coupled to one or more accessories.

FIG. 2 illustrates an exemplary engine assembly 160 incorporating a gas turbine engine 120. In this disclosure, like reference numerals designate like elements where appropriate and reference numerals with the addition of one-hundred or multiples thereof designate modified elements that are understood to incorporate the same features and benefits of the corresponding original elements. The engine assembly 160 may be incorporated into or otherwise coupled to a vehicle, such as an aircraft. Although the engine 120 is illustrated as a two-spool engine, other architectures can benefit from the teachings disclosed herein including three-spool gas turbine engine architectures. Other systems may also benefit from the teachings of this disclosure, including gas turbine engines lacking a fan for propulsion.

The engine 120 can include a low speed (e.g., first) spool 130 and a high speed (e.g., second) spool 132. The first spool 130 can include an inner (e.g., first) shaft 140 that interconnects a low pressure (e.g., first) compressor 144 and a fan drive (e.g., low pressure) turbine 146. The low speed spool 130 is defined as the low pressure compressor 144, fan drive turbine 146 and inner shaft 140. The fan drive turbine 146 can drive a fan 142 through a geared architecture 148 such that the fan 142 is rotatable at a lower speed than a speed of the low speed spool 130. A gear reduction ratio of the geared architecture 148 can be greater than or equal to 3.0, or more narrowly greater than or equal to 3.2 or 3.4. The gear reduction ratio can be less than or equal to 4.0. The fan drive turbine 146 can drive the low pressure compressor 144 and an input of the geared architecture 148 such that the low pressure compressor 144 and the fan drive turbine 146 are rotatable at a common speed and in a common direction. The high speed spool 132 can include an outer (e.g., second) shaft 150 that interconnects a high pressure (e.g., second) compressor 152 and high pressure (e.g., second) turbine 154. The high speed spool 132 is defined as the high pressure compressor 152, high pressure turbine 154 and outer shaft 150.

Each of the low pressure compressor 144, high pressure compressor 152, high pressure turbine 154 and/or low pressure turbine 146 can include one or more stages, including any of the stage counts disclosed herein. In embodiments, the low pressure compressor 152 includes three or four stages, the high pressure turbine 154 includes one or two stages, and the fan drive turbine 146 includes at least three stages but no more than six stages. A bypass ratio can be defined as a volume of air passing to the bypass duct 113 divided by a volume of air passing into the compressor section 124. The engine 120 can incorporate any of the bypass ratios disclosed herein, such as a bypass ratio of greater than or equal to 10.0 at cruise. The fan 142, low pressure compressor 144 and high pressure compressor 152 can establish any of the OPRs disclosed herein, including an OPR of greater than or equal to 44.0 at cruise, more narrowly greater than or equal to 50.0 at cruise, or even more narrowly less than or equal to 60.0 at cruise.

The assembly 160 can include a first set of accessories 162 and a second set of accessories 164. The first set of accessories 162 can include one or more engine accessories (ACC-E) coupled to the engine 120. For the purposes of this disclosure, an "engine accessory" performs sub-system functionality to operate an associated engine. The first set of accessories 162 can be configured to control or otherwise facilitate operation of one or more components of the engine 120. Exemplary engine accessories can include fuel pumps, oil pumps, generators, starters, actuators, sensors, etc. The second set of accessories 164 can include one or more aircraft accessories (ACC-A) coupled to an aircraft. For the purposes of this disclosure, an "aircraft accessory" performs sub-system functionality to operate an associated aircraft. The second set of accessories 164 can be configured to control or otherwise facilitate operation of one or more components of the aircraft. Exemplary aircraft accessories can include generators, actuators, pumps, environmental control systems (ECS), fire control systems (FCS), communication and navigation systems, etc.

Various techniques may be utilized to drive the accessories 162, 164. The assembly 160 can include a first power takeoff 165 and a second power takeoff 167. The first power takeoff 165 can be established by a low (e.g., first) towershaft 166. The second power takeoff 167 can be established by a high (e.g., second) towershaft 168. The low towershaft 166 can be coupled to the inner shaft 140. The high towershaft 168 can be coupled to the outer shaft 150. In embodiments, the assembly 160 can include a first accessory gearbox 170 and/or a second accessory gearbox 172 (shown in dashed lines for illustrative purposes). In other embodiments, the first accessory gearbox 170 and/or second accessory gearbox 172 are omitted.

The first accessory gearbox 170 can be configured to interconnect the inner shaft 140 and one or more of the aircraft accessories 164. In embodiments, the first accessory gearbox 170 can be configured to interconnect the inner shaft 140 and one or more engine accessories 162 (coupling shown in dashed lines for illustrative purposes). The second accessory gearbox 172 can be configured to interconnect the outer shaft 150 and one or more of the engine accessories 162. In embodiments, second accessory gearbox 172 can be configured to interconnect the outer shaft 150 and one or more aircraft accessories 164 (coupling shown in dashed lines for illustrative purposes). In embodiments, the low towershaft 166 and inner shaft 140 do not drive any of the engine accessories 162 and/or the high towershaft 168 and outer shaft 150 do not drive any of the aircraft accessories 164.

The gas turbine engine 120 is rated to generate an amount of thrust at a ground idle condition. The ground idle condition is measured at a minimum sustainable speed and thrust of the engine at static sea-level and 111 degrees Fahrenheit (° F.) that is sufficient for the engine to operate normally without exceeding any engine limits (e.g., stability, temperature, etc.). The engine 120 can generate sufficient thrust to drive all accessories coupled to the engine 120 at ground idle, including the engine and aircraft accessories 162, 164. The gas turbine engine 120 can be rated to generate an amount of thrust that is greater than or equal to 600 pound-force (lbf) at ground idle, or more narrowly greater than or equal to 1,000 lbf of thrust at ground idle. In embodiments, the gas turbine engine 120 is rated to generate less than or equal to 3,500 lbf of thrust at ground idle.

The gas turbine engine 120 is rated to provide an amount of thrust at the MTO condition. The gas turbine engine 120 can be rated to generate an amount of thrust that is greater than or equal to 20,000 lbf at MTO, more narrowly greater than or equal to 30,000 lbf of thrust at MTO, or even more narrowly less than or equal to 100,000 lbf of thrust at MTO.

The engine 120 is designed to establish a unique balance of thrust at ground idle as compared to thrust at MTO, which may be referred to an idle thrust ratio (hereinafter thrust ratio). Various techniques can be utilized to establish this unique balance, such as a higher gear ratio and/or a shift in work from the high speed spool 132 and high pressure compressor 152 to the low speed spool 130 and low pressure compressor 152 as compared to Applicant's first generation geared gas turbine engines. This shift in work from the high speed spool 132 to the low speed spool 130 can be facilitated by driving relatively more aircraft accessories with the low speed spool 130 than with the high speed spool 132, which may increase the load on the low speed spool 130 and decrease the load on the high speed spool 132.

The thrust ratio can be defined as a ratio of the amount of thrust at ground idle divided by the amount of thrust at MTO. In embodiments, the engine 120 establishes a thrust ratio that is less than or equal to 0.050, or more narrowly greater than or equal to 0.020. In embodiments, the thrust ratio is greater than or equal to 0.025. The thrust ratio can be less than or equal to 0.040 or 0.045, or more narrowly can be greater than or equal to 0.030. The following example engines would come within the scope of this disclosure.

|  | Engine 1 | Engine 2 | Engine 3 | Engine 4 |
|---|---|---|---|---|
| Ground Idle (GI) thrust | 3125 lbf | 622 lbf | 1100 lbf | 1100 lbf |
| MTO thrust | 94027 lbf | 25360 lbf | 24240 lbf | 32980 lbf |
| GI/MTO thrust | 0.033 | 0.025 | 0.045 | 0.033 |

Engines incorporating the teachings disclosed herein, including the disclosed thrust ratios, may have reduced fuel burn at ground idle, descent idle, and approach idle. The disclosed thrust ratios may also improve operability of the engine at other conditions, including improved flight idle. The disclosed thrust ratios may also improve aircraft glide slope range at engine idle which may allow airplanes more flexibility to maintain patterns during descent and approach. The disclosed thrust ratios may also improve the range at which the aircraft lift-to-drag ratio can be designed where descent idle may be a constraint.

In Applicant's first generation gas turbine geared engines, the thrust ratios were on the order of 0.041 in one engine, 0.042 in another engine, and 0.089 in yet another engine. These first generation engines had a combined pressure ratio across the root of the fan blade alone and the low pressure compressor on the order of 3.1 or less at cruise, as well as an OPR on the order of 41.7 or less at cruise. These thrust ratios corresponded to a relatively lesser amount of work performed by the low speed spool.

The engine 120 can be configured such that at least a majority of all aircraft accessories powered or driven by the engine 120 are driven by the low speed spool 130 and not the high speed spool 132. The aircraft accessories 164 can be coupled to and driven by the engine 120 according to a power extraction ratio. The power extraction ratio is defined as a first quantity of power extracted by all aircraft accessories driven by the first power takeoff 165 divided by a total quantity of power extracted by all aircraft accessories driven by the first power takeoff 165 and all aircraft accessories driven by the second power takeoff 167 (if any). The aircraft accessories 164 can be driven by the engine 120 such that the power extraction ratio is equal to or greater than 0.90 at ground idle, or more narrowly greater than or equal to 0.95 at ground idle. In embodiments, all aircraft accessories 164 powered or driven by the engine 120 are driven by the low speed spool 130 and not the high speed spool 132 such that the power extraction ratio is 1.0 at ground idle.

As discussed above, engines coming under this disclosure may shift more of the work from the high speed spool 132 and high pressure compressor 152 to the low speed spool 130 and low pressure compressor 144 compared to Applicant's first generation geared gas turbine engines. The shift in work to the low speed spool 130 and low pressure compressor 144 may result in a relatively greater amount of flow through the core flow path C at ground idle as compared to Applicant's first generation geared gas turbine engines. As an example, in the first generation engines mentioned above where the thrust ratio was 0.041, a combined pressure ratio defined as a product of a fan pressure ratio across the fan blade alone at the root and a pressure ratio of the low pressure compressor was 2.9 or 3.1. In the first generation engine mentioned above where the thrust ratio was 0.042, the combined pressure ratio was 3.1. Utilizing the techniques disclosed herein, the engine 120 can establish relatively greater combined pressure ratios as compared to Applicant's first generation geared engines.

The engines designed under this disclosure establishing the disclosed thrust ratios, including the engine 120, can include a combined pressure ratio defined by a product of the fan pressure ratio across the fan blade 143 alone at the root and a pressure ratio of the low pressure compressor 144. The combined pressure ratio can be greater than or equal to 3.5 at cruise, and in embodiments can be greater than or equal to 4.0 or 5.0 at cruise, and more narrowly can be less than or equal to 6.0 or 6.5 at cruise. The fan pressure ratio can include any of the values disclosed herein, such as less than or equal to 1.45 at cruise, or more narrowly less than or equal to 1.40 at cruise. In embodiments, the fan pressure ratio is less than or equal to 1.35 at cruise.

The combination of the ratios disclosed above can result in synergistic benefits with regard to the efficient operation of the associated engine. The disclosures here can be said to provide efficient operation, with each disclosed ratio, but the combination of the ratios is particularly powerful. As the gear reduction ratio increases, work can be shifted from the high speed spool to the low speed spool. The increase in work capability can be utilized to shift power extraction of accessories from the high pressure spool to the low speed spool, which can improve efficiency of the high pressure compressor and improve fuel consumption.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
a propulsor section including a propulsor having a plurality of propulsor blades;
a geared architecture;
a first spool including a first shaft that interconnects a first compressor and a first turbine, wherein the first compressor includes three stages, wherein the first turbine drives the propulsor through the geared architecture such that the propulsor is rotatable at a lower speed than a speed of the first spool, wherein the first turbine includes an inlet, an outlet and a turbine pressure ratio greater than or equal to 8.0 at cruise, and wherein the turbine pressure ratio is pressure measured prior to the inlet as related to pressure at the outlet prior to an exhaust nozzle;
a second spool including a second shaft that interconnects a second compressor and a second turbine, wherein the second turbine includes two stages, and the first turbine includes a greater number of stages than the second turbine;
a first power takeoff from the first spool; and
a second power takeoff from the second spool;
wherein a second pressure ratio across the second compressor is greater than 7.0 at cruise;
wherein the gas turbine engine is rated to provide an amount of thrust at ground idle, and the gas turbine engine is rated to provide an amount of thrust at maximum takeoff, and wherein a thrust ratio is defined as a ratio of the amount of thrust at ground idle divided by the amount of thrust at maximum takeoff, the thrust ratio is less than or equal to 0.050, and ground idle is measured at static sea-level and 111 degrees Fahrenheit;
wherein a first quantity of power extracted by all aircraft accessories driven by the first power takeoff is non-zero at ground idle and a second quantity of power extracted by all aircraft accessories driven by the second power takeoff is non-zero at ground idle; and
wherein a power extraction ratio, defined as the first quantity of power extracted by all aircraft accessories driven by the first power takeoff divided by a sum of the first quantity of power and the second quantity of power, is equal to or greater than 0.90 at ground idle, and wherein the aircraft accessories perform sub-system functionality to operate an associated aircraft.

2. The gas turbine engine as recited in claim 1, wherein a gear reduction ratio of the geared architecture is greater than or equal to 3.2.

3. The gas turbine engine as recited in claim 1, wherein the first turbine drives the first compressor and an input of the geared architecture.

4. The gas turbine engine as recited in claim 3, wherein the gas turbine engine is rated to generate greater than or equal to 20,000 lb of thrust at maximum takeoff.

5. The gas turbine engine as recited in claim 4, wherein the gas turbine engine is rated to generate greater than or equal to 1,000 lb of thrust at ground idle.

6. The gas turbine engine as recited in claim 5, wherein the thrust ratio is greater than or equal to 0.020.

7. The gas turbine engine as recited in claim 1, wherein the propulsor is a fan, the propulsor blades are fan blades, and an outer housing surrounds the fan blades to establish a bypass duct.

8. The gas turbine engine as recited in claim 7, wherein a bypass ratio defined as a volume of air passing to the bypass duct divided by a volume of air passing into a compressor section comprising the first compressor, is greater than or equal to 10.0 at cruise.

9. The gas turbine engine as recited in claim 8, wherein an overall pressure ratio is defined as a product of a fan pressure ratio across a root of the fan blade alone, a first pressure ratio across the first compressor and the second pressure ratio across the second compressor, and wherein the overall pressure ratio is equal to or greater than 44.0 at cruise.

10. The gas turbine engine as recited in claim 9, wherein a combined pressure ratio is defined as a product of the propulsor pressure ratio across the root of the propulsor blade alone and the first pressure ratio, and the combined pressure ratio is greater than or equal to 3.5 at cruise.

11. The gas turbine engine as recited in claim 10, wherein the thrust ratio is less than or equal to 0.040.

12. The gas turbine engine as recited in claim 10, wherein the first compressor includes four stages, and the first turbine includes no more than six stages.

13. The gas turbine engine as recited in claim 12, wherein the thrust ratio is greater than or equal to 0.030.

14. The gas turbine engine as recited in claim 12, wherein the overall pressure ratio is greater than or equal to 50.0 at cruise.

15. A gas turbine engine comprising:
a propulsor section including a propulsor having a plurality of propulsor blades;
a geared architecture defining a gear reduction ratio of greater than or equal to 3.0;
a first spool including a first shaft that interconnects a first compressor and a first turbine, wherein the first compressor includes three stages, and the first turbine drives the propulsor through the geared architecture such that the propulsor is rotatable at a lower speed than a speed of the first spool;
a second spool including a second shaft that interconnects a second compressor and a second turbine;
a first power takeoff from the first spool;
a second power takeoff from the second spool; and
wherein the gas turbine engine is rated to provide an amount of thrust at ground idle, and the gas turbine engine is rated to provide an amount of thrust at maximum takeoff, and wherein a thrust ratio is defined as a ratio of the amount of thrust at ground idle divided by the amount of thrust at maximum takeoff, and the thrust ratio is less than or equal to 0.050;

wherein a first quantity of power extracted by all aircraft accessories driven by the first power takeoff is non-zero at ground idle and a second quantity of power extracted by all aircraft accessories driven by the second power takeoff is non-zero at ground idle; and wherein a power extraction ratio, defined as the first quantity of power extracted by all aircraft accessories driven by the first power takeoff divided by a sum of the first quantity of power and the second quantity of power is equal to or greater than 0.90 at ground idle, ground idle is measured at static sea-level and 111 degrees Fahrenheit, and wherein the aircraft accessories perform sub-system functionality to operate an associated aircraft.

16. The gas turbine engine as recited in claim 15, wherein the propulsor is a fan, the propulsor blades are fan blades, and an outer housing surrounds the fan blades to establish a bypass duct.

17. The gas turbine engine as recited in claim 16, wherein:
a bypass ratio defined as a volume of air passing to the bypass duct divided by a volume of air passing into a compressor section comprising the first compressor, is greater than or equal to 10.0 at cruise; and
a combined pressure ratio is defined as a product of a propulsor pressure ratio across a root of the propulsor blade alone and a first pressure ratio across the first compressor, and the combined pressure ratio is greater than or equal to 3.5 and less than or equal to 6.0 at cruise.

18. The gas turbine engine as recited in claim 17, wherein:
the propulsor pressure ratio across the root of the propulsor blade alone is less than or equal to 1.45 at cruise; and
the thrust ratio is greater than or equal to 0.020.

19. The gas turbine engine as recited in claim 17, wherein:
a gear reduction ratio of the geared architecture is greater than or equal to 3.2; and
the gas turbine engine is rated to generate greater than or equal to 20,000 lb of thrust at maximum takeoff.

20. The gas turbine engine as recited in claim 15, wherein the power extraction ratio is greater than or equal to 0.95 at ground idle.

21. The gas turbine engine as recited in claim 20, wherein:
the thrust ratio is greater than or equal to 0.025;
the gas turbine engine is rated to generate greater than or equal to 20,000 lb of thrust at maximum takeoff; and
a gear reduction ratio of the geared architecture is less than or equal to 4.0.

* * * * *